DANIEL SILVERMAN
INVENTOR.

BY John D. Dassett
ATTORNEY

DANIEL SILVERMAN
INVENTOR.

BY John D. Gassett
ATTORNEY

United States Patent Office 3,474,459
Patented Oct. 21, 1969

3,474,459
OPTICAL DISPLAY SYSTEM USING CONTROLLED DEFLECTIONS OF A COLLIMATED BEAM OF RADIANT ENERGY
Daniel Silverman, Tulsa, Okla., assignor to Pan American Petroleum Corporation, Tulsa, Okla., a corporation of Delaware
Filed Jan. 8, 1968, Ser. No. 696,170
Int. Cl. G01d 15/10, 9/42
U.S. Cl. 346—108    12 Claims

ABSTRACT OF THE DISCLOSURE

This is an optical display system using a collimated beam of radiant energy such as light from a laser source. Means are provided to bring information from storage, such as from a computer, to modulate the intensity of the laser beam. Means are provided to move the modulated beam in either the X or Y dimension. A rotating mirror sweeps the beam in coordinate Y and a plurality of optical elements such as thin prisms are moved into or out of the path of the laser beam to effect varying degrees of deflection along the X ordinate.

Figure 1:
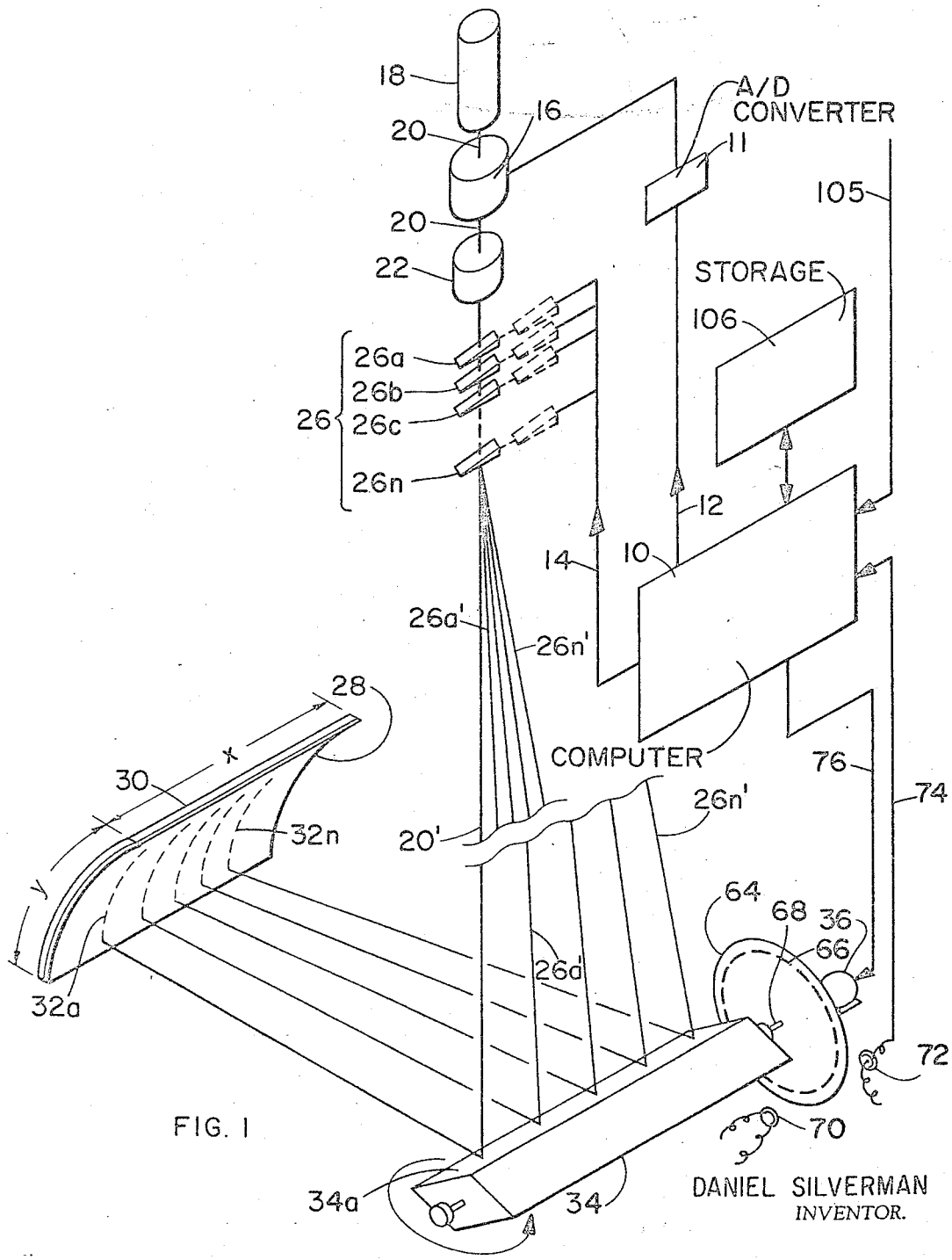

This invention relates to an optical display system for making records of information. It relates especially to a display system for making optical records of seismic information.

BACKGROUND

Recently modern digital computers have been used to process seismic signals. These computers can provide various corrections and filtering actions on the raw seismic signal fed thereto. The output signals from the computers are in such form that the information thereon is much more useable if properly displayed. It is elementary that the output from the digital computers must be displayed optically so that seismic interpreters can view the finished cross section for interpretation of subsurface strata. In my prior application S.N. 376,939, filed June 22, 1964, now Patent 3,293,657, issued Dec. 20, 1966, I disclosed a rotating mirror and CRTS (cathode ray tube source) plotter. When a spot of light is used to display the seismic information, in addition to modulating the intensity of the spot according to the signal amplitude, means must be provided to move the spot in two coordinate directions. These can be the X and Y coordinates, or in a seismic section they represent time in one direction and geophone spacing or locations in the other. It may be well to point out that the seismic section display is a plurality of side-by-side channels or seismic traces. Each of the traces is a record of the signal received at one geophone position. The spacing between traces corresponds to the distance along the line of spread between adjacent geophone positions.

Thus, in utilizing a "spot" (or beam of radiant energy) in plotting the seismic signal from a digital computer there are several factors involved:

(1) The ability to move the spot selectively in the X (or spread) direction and in the Y (or time) direction;
(2) Spot intensity;
(3) If a CRTS is used there is the ever-present danger of burning the phosphor;
(4) If a high intensity spot is used, the matter of sharpness or focus of the spot.

In deciding what type plotter to use, consideration (1) listed above indicates that a CRT source might be best considering the ease of deflection. However, the use of the CRT source brings up other problems such as in considerations (2), (3) and (4). It is thus seen that there is a need for improvement in this area.

BRIEF DESCRIPTION OF THE INVENTION

A beam from a laser source has great intensity and good resolution and can be controlled or modulated in intensity. The difficulty in using the laser beam as the source of radiant energy in plotting information from a high speed computer is effecting movement or deflection of the beam in the X direction. The present invention provides means for readily moving the laser beam in the X direction as desired.

My invention concerns means to obtain information from a digital computer to modulate a collimated beam of radiant energy. Means are provided to relatively sweep such beam across a recording medium in the direction of the Y or time coordinate. Means are further provided to deflect the beam in the X direction by a pre-determined angle after the beam has been generated. This latter means preferably is a plurality of thin prisms. By selectively placing different combinations of the prisms in the path of the beam, many varied deflections can be obtained. Any such deflection can be repeated exactly by replacing the same combination of prisms.

Figure 2:
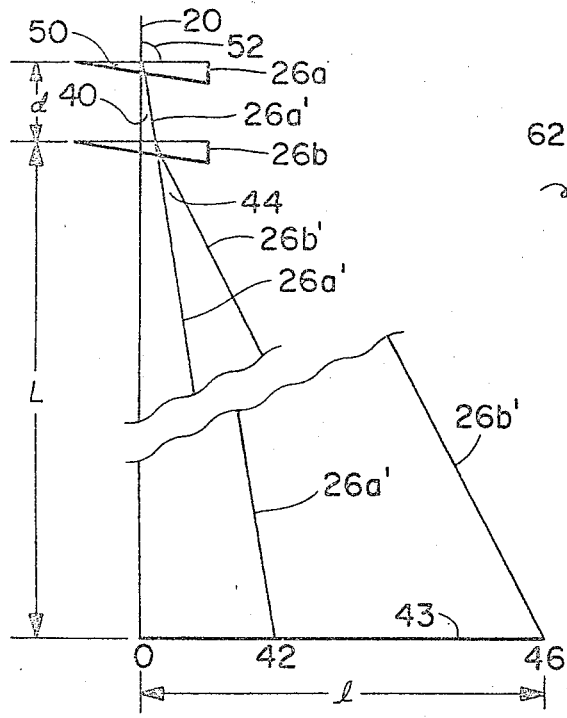
Figure 3:
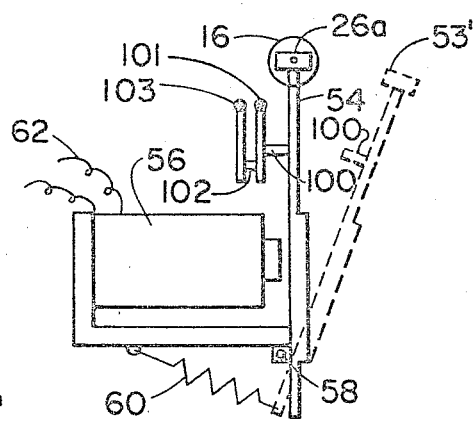
Figure 4:
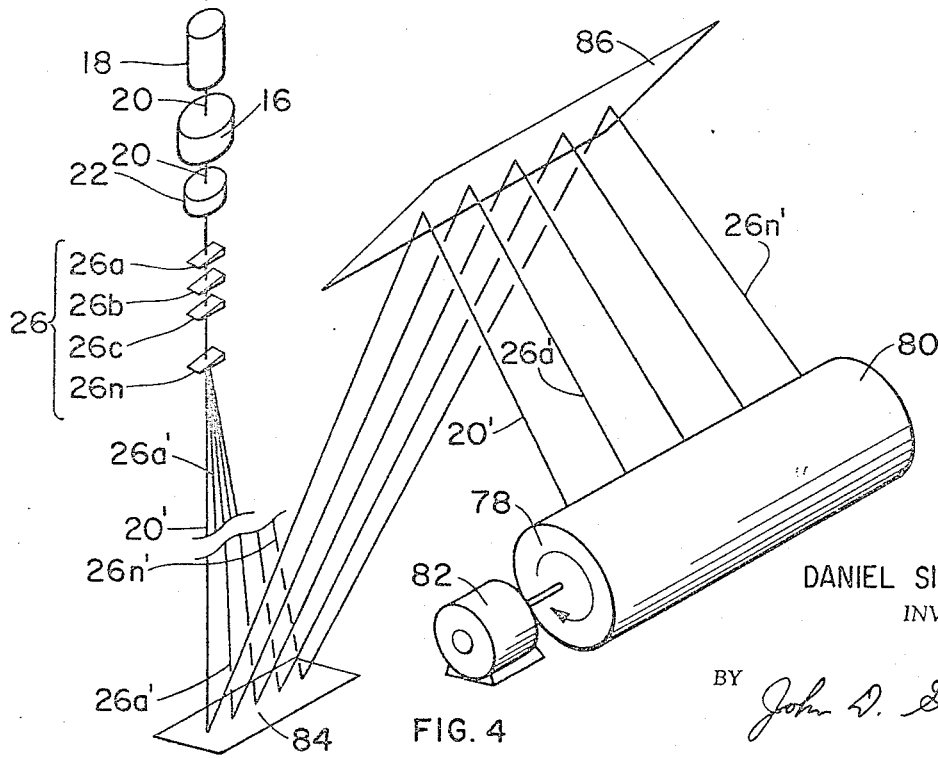
Figure 5:
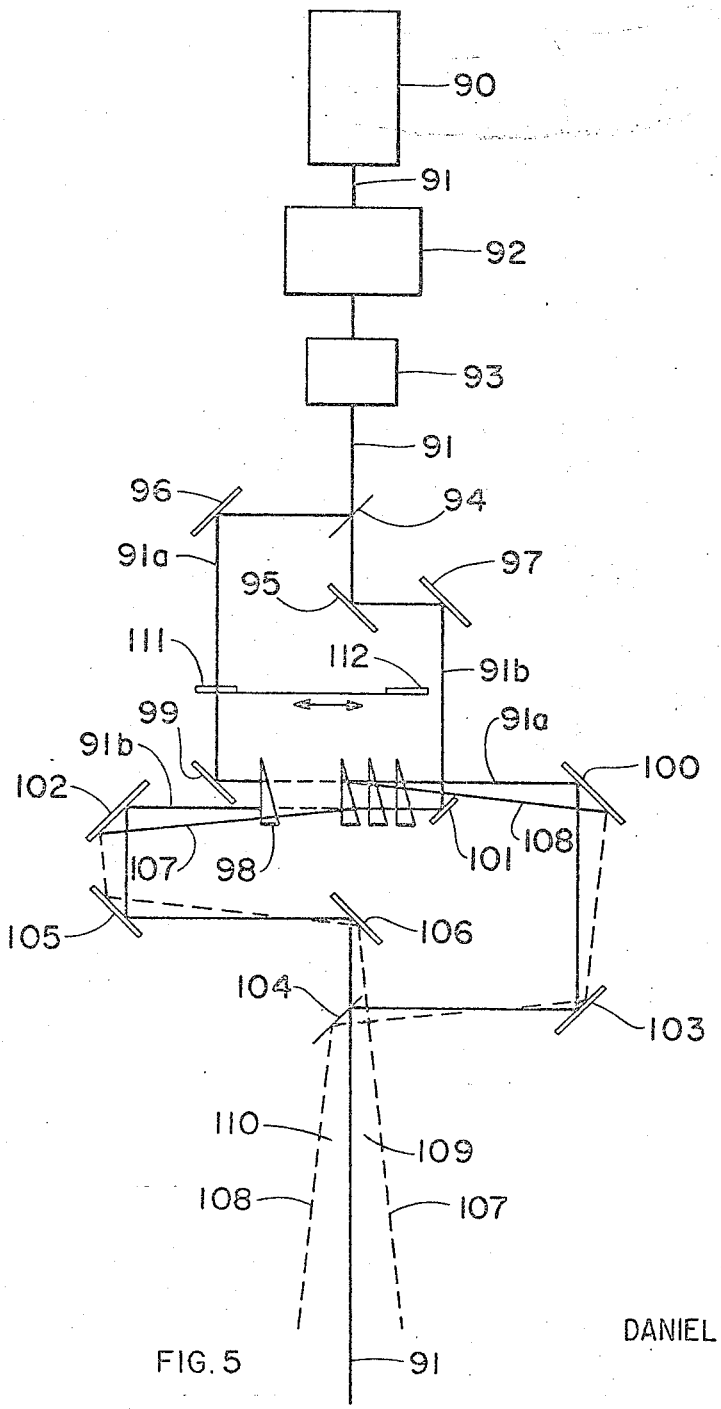

Various objects and a better understanding of the invention can be had from the following description taken in conjunction with the drawings in which:

FIGURE 1 illustrates the preferred embodiment of the invention;
FIGURE 2 illustrates the deflection of a collimated beam of radiant energy by thin prisms;
FIGURE 3 illustrates one mechanism for moving a prism of FIGURE 1 into and out of the path of the collimated beam;
FIGURE 4 illustrates a modification of the embodiment of FIGURE 1 wherein the mirror of FIGURE 1 is replaced by a drum on which the recording medium is placed; and
FIGURE 5 illustrates another embodiment of the invention in which the collimated beam can be deflected on either side of its normal position.

Attention is first directed to FIGURE 1 which shows a preferred embodiment of the invention. There is shown in the drawing a computer 10, a source 18 providing a collimated beam of radiant energy, means 26 for selectively deflecting the collimated beam to an X position as commanded by the computer, rotating mirror 34 for deflecting the beam in the Y direction, and a recording medium 28 for receiving the beam. Computer 10 can be any commercially available computer which has inlets for receiving information and/or instruction, and outlets for putting out information and/or commands. Computer 10 has two such outlets, indicated as 12 and 14. Outlet 12 contains information as to the signal to be recorded and is used to direct modulator 16. The other outlet 14 of computer 10 is of a character to control the X position of the beam as will be seen. The storage 106 is part of the computer in which information is stored until called for by the recorder. The inlet 105 is for supplying information and instruction to the computer.

Attention is now directed toward the radiant energy source for producing a collimated beam and the means for moving that beam in the X direction. Reference numeral 18 represents a radiant energy source which is preferred to be a laser. The output of radiant energy source 18 is indicated as a line 20 which is a collimated beam of radiant energy, and, as stated in this preferred case, is a laser beam. Beam 20 passes through modulator 16 which controls the intensity of the beam 20 in accordance with directions from computer 10. Modulated beam 20 after passing through modulator 16 goes through optics 22 as may be required.

I shall now consider that portion of my invention which permits beam 20 to be directed or deflected along the X axis in a selected manner. This includes a plurality of thin prisms 26a through 26n. As will be explained more fully in connection with FIGURE 2, the specific combination of the prisms which are in the path of beam 20 determines the exact X deflection of the beam. The dotted prisms indicate that the prisms can be removed in any combination from such path upon direction from computer 10. Means for removing these prisms are shown in FIGURE 3 and will be discused more hereinafter.

The beam of 20 after passing through various groupings of prisms 26 will take one of many paths, such as beams 26a' through 26n'. If there are no prisms in the path of the beam, the beam takes a path 20' which is not deflected. Thus, it is seen that the beam 20 can be deflected along the X dimension as desired to selected positions.

Attention will now be directed to the means for moving the modulated beam along the Y or time axis. There is shown a recording medium 28 which is supported on a slightly concave frame 30. The X dimension and Y dimension are shown in relation to this recording medium 28. Shown on recording medium 28 are traces 32a to 32n in the direction Y which correspond to beams 26a, to 26n'.

The deflected light beams 26a' to 26n' are directed onto one surface of multi-surface mirror 34 which has in this embodiment a plane mirror surface on each of four sides. A motor 36 having axle 68 is provided to rotate mirror 34 as indicated by the arrow. As the beams 26' strike the mirror surface 34a, they are directed toward recording medium 28. By rotating the mirror 34, the beams 26' are caused to sweep along the surface of the recording medium 28.

Also shown in FIGURE 1 are means for telling the computer that a certain cycle or part of a cycle of rotation of mirror 34 has been made or that the recorder is in condition to receive information. This includes a disc 64 having a plurality of perforations or slots 66 therein. This disc 64 is mounted upon axle 68 upon which mirror 34 is also mounted. A light source 70 and a photoelectric cell 72 are on opposite sides of the disc 64. Each time the disc turns a selected angle so that light again passes through a slot, a signal is given through line 74 to computer 10. A line 76 connects an outlet from computer 10 to motor 36 and directs the motor to start and stop. The signals sent from disc 64 over line 74 can be either a signal that the recorder is in condition to receive a plurality of series of bits of information, or that a specific series of bits are to be read out, and successive signals will call for successive series of bits.

Attention is next directed to FIGURE 2 for giving a brief explanation of the deflection of the beam by the insertion of prisms. For purpose of this illustration, there are shown only two prisms 26a and 26b. The collimated beam 20, when undeflected, as when prisms 26a and 26b are removed, strikes a base line 43 at 0. When there is one prism 26a inserted, beam 20 is deflected as indicated by line 26a' by angle 40. The particular angle 40 is dependent upon laws of optics in connection with the material and shape of the individual prism. This deflected beam 26a' strikes base line 43 at point 42. If still a second prism 26b is placed in the path of beam 20, the beam takes a further deflection such as indicated by beam 26b' and it has a deflection of angle 44 from deflected beam 26a'. Again, the particular deflection is determined by the shape of the prisms and well known optical laws. The deflected beam 26b' strikes the base line at 46. The distance between prisms 26a and 26b is designated $d$ and the distance from the prism 26b to the base line 43 is designated L. Base line 43 can correspond to a line lying in the surface of the recording medium 28 in a direction parallel to the axis of rotation of the mirror 34. This direction is perpendicular to the direction of sweep 32 of the beam across the medium 28 as shown in FIGURE 1. Length L from prism 26b to line 43 is preferably much greater than length $d$ and it is also much greater than length $l$; therefore, the distances along base line 43 can be considered to be proportional to the angles of deflection produced by the prisms. In this regard, for example, the distance L should be at least five times the length $d$ or $l$, and preferably at least about ten times.

Normally the prisms 26 are designed so that deflection angles 40, 44, etc., are in a binary progression. Then by combination of a plurality of prisms, deflection angles of any magnitude corresponding to integer multiples of the smallest angle of deflection are possible by the proper choice of prisms. In this way the number of separate prisms required is kept to a minimum. The prism is an ideal component to use since the deflection angle 40, 44, etc., is only a function of the prism wedge angle 50 and material, and is not a function of the placement angle 52. Thus it is not required to accurately replace the prisms in the same position for exact repeat deflection of beam 20.

Attention is now directed to FIGURE 3 which illustrates one manner of moving the prisms 26 in and out of position. Shown thereon is a prism 26a which is supported on arm 54 of a relay 56. The arm is pivoted at pivot 58 and is urged outwardly into the position indicated by the dashed line by spring 60. The relay is actuated by applying current to leads 62 in a known manner. Thus the prisms may be moved in and out by direction from computer 10. When the arm 54 is in the position shown, the prism 26a is centered over the axis of the modulator 16 and the beam 20 thus passes through the prism.

Shown on arm 54 is an insulated projection 100 which in the closed position of the relay shown presses contact 102 on leaf 101 into contact with leaf 103. Leads are carried from 101 and 103 to the computer to signal that the prism 26a is in position to intercept beam 20.

Attention is now directed to FIGURE 4 which illustrates a modification of the embodiment of FIGURE 1. In FIGURE 1 the beam sweeps along the Y axis of recording medium 48 by the revolving of mirror surface 34a. FIGURE 4 illustrates another manner of relatively sweeping, in effect, the beam along the Y axis of the recording medium. Shown in FIGURE 4 is a recording drum 78 upon which is mounted a recording medium 80. The drum is turned by motor 82. The drum 78 is arranged so that beams 26a' to 26n' intercept the recording medium 80 along a line which is parallel to the axis of the drum. These light beams 26a' to 26n' can travel directly from the deflecting prisms 26 to the drum surface, or if space is a requirement, they can be reflected off a first mirror surface 84 and second mirror surface 86 as indicated in FIGURE 4. The remainder of the optical system, that is the source 18, modulator 16, optics 22, prisms 26, etc., are the same as that of FIGURE 1. The disc 64, light source 70 and photoelectric cell 71, as shown in FIGURE 1 would, of course, be mounted on the shaft of drum 78.

Attention is next directed to FIGURE 5. It will be recalled that in FIGURE 1 the beam 20' was deflected in only one direction along the X axis with respect to the position of the undeflected beam. The device of FIGURE 5 has the ability to deflect the beam 20' on each side of the position of the undeflected beam. This permits the same number of positions or deflections on each side thereof, or doubling the number of beam positions without increase in the number of prisms. Or conversely, the same total range of deflection can be done with one less prism. Also, the length $l$ (FIGURE 2) is cut in half so that the requirement that L be large compared to $l$ is more easily met. In FIGURE 5 there is illustrated a laser 90 whose beam 91 passes through an intensity or amplitude modulator 92 which is similar to the amplitude modulator 16 of FIGURE 1 and is likewise controlled by commands from a computer. Beam 91 passes through optics 93 and is directed toward a light splitting device 94. This light splitting device can be a half-silvered mirror, for example, which splits the beam into two paths, that is, a part of the beam goes through light splitting device 94 towards mirror 95 and a part is reflected toward mirror 96. We thus have a first light stream 91a and a second one 91b. Light 91b is directed downwardly parallel to beam 91a by mirror 97.

Shown in FIGURE 5 are a plurality of light prisms 98 which can be moved into and out of the path of beam 91a and 91b similarly as were light prisms 26a to 26n of FIGURE 1. Here mirror 99 directs light beam 91a though the prisms 98 toward mirror 100. Likewise mirror 101 directs light beams 91b through the prisms in the reverse order toward mirror 102. Deflected light beam 91a strikes mirror 100 which deflects it toward mirror 103 which directs it toward half-silvered mirror 104 which directs it downwardly along the line 91.

The other half of the split beam 91b is directed from mirror 102 on to mirror 105 to mirror 106 and downwardly to half-silvered mirror 104 and falls identically on light beam 91. The various mirrors are so arranged that the split light beams reunite and re-form as one beam when undeflected, i.e., when prisms 98 are all removed from the path of the beam.

The light beams can be deflected by moving any combination of prisms 98 into the path of beam 91a or 91b as they are reflected from mirrors 101 and 99, respectively. The particular portion of the prisms 98 which the light beams intersect does not alter their angle of deflection. Thus, for the same combination of prisms the light beams 91a and 91b would be deflected the same amount into positions 107 and 108. These deflected beams are reflected by the same mirrors reflecting the undeflected beams. Thus, angles 109, 110 which are the angles between undeflected beam 91 and deflected beams 107 and 108, respectively, are equal.

Normally it is desired to have only deflections on one side or the other of beam 91. This is accomplished by having shutters or masks 111 and 112 which can be moved into the path of one or the other of the beams 91a and 91b, respectively. The operation of masks 111, 112 is controlled by the computer. Means are provided (not shown) similar to 101, 103 of FIGURE 3 for communicating to the computer the position of the masks.

In operation the computer instructs the prisms 98 and masks 111, 112 to assume certain positions. When the computer receives return signals that the proper positions have been taken, it is now ready to read out of storage 106 the proper information. Means for reading positions of mechanical equipment and for sending information of such reading back to the computer are well kown and will not be discussed herein in detail. When it receives the proper signals from disc 64 and photocell 72, it starts supplying information to the modulator 16 to modulate the beam 20 in accordance with the information in storage 106.

The information recorded in each trace is preferably an analog function, and the intensity of the modulated beam at each instant is a function of the amplitude of the analog function at that instant. The analog information can be stored in the computer in digital form; in which case as the digital information is read out of the computer as by line 12, FIGURE 1, it passes to a digital to analog converter 11, which converts the information to analog form as it goes to the modulator 16. Of course, purely digital information can be recorded in the form of patterns of black dots on a white recording sheet.

While the above invention has been described with a great deal of detail it is to be understood that further modifications can be made without departing from the spirit or scope thereof.

I claim:

1. An optical display system for making records of information to be displayed in two dimensions on a recording medium, comprising:
  (a) means to store said information and to read it out of storage;
    said information made up of elements of information corresponding in location to a plurality of sequential values of Y for each of a plurality of discrete spaced reproducible values of X;
  (b) a source of radiant energy in the form of a collimated beam of radiant energy;
  (c) a recording medium sensitive to said beam of radiant energy;
  (d) sweep means to relatively sweep said beam across said record medium in the direction of one coordinate Y of each of a plurality of discrete constant values of the other coordinate X;
  (e) means to intensity modulate said beam of radiant energy in accordance with said information;
  (f) deflecting means to deflect said beam in the direction X by one of a plurality of predetermined discrete angles after said beam has been swept in Y, said deflecting means including a plurality of optical elements, each such optical element adapted to deflect said beam by a predetermined discrete angular value, and means to removably insert at least one of said elements in the path of said beam in response to information from means (a); and
  (g) means responsive to said sweep means and said deflection means for reading out said information from storage.

2. An apparatus as in claim 1 including means to simultaneously utilize a plurality of said optical elements in which the effect of said elements is additive.

3. An apparatus as in claim 1 in which said means to deflect said beam in the direction X comprise a plurality of thin prisms.

4. An apparatus as in claim 3 in which the prisms each have a different wedge angle.

5. An apparatus as in claim 4 in which the angle of each said wedge is chosen so that any combination of wedges inserted into the path of said beam deflects said beam by an angle which is one of multiples in powers of 2 of a minimum angle such as to deflect said beam by the minimum spacing between sweeps on said medium, and including means to interpose in the path of said beam a plurality of said prisms in accordance with the information read from said storage means.

6. Apparatus as in claim 3 including means to split said beam into two component beams, means to pass each of said component beams through said prisms in opposite directions, and means to select one or the other of said component beams to record on said medium.

7. An apparatus as in claim 1 in which said information is analog, and a complete trace of information is read out at one time corresponding to a single sweep, and means to choose the proper deflection angle X corresponding to the specific trace being displayed.

8. An apparatus as in claim 1 in which said information is digital, and including D/A means between said storage and said means to modulate.

9. An apparatus as in claim 1 in which said record medium is stationary and said beam sweeps across said medium.

10. Apparatus as in claim 1 in which said beam is stationary and said record medium sweeps past said beam.

11. Apparatus as in claim 1 including means to alternatively pass said beam through said plurality of optical elements in opposite directions, whereby deflection of said beam in opposite directions from the undeflected position is obtained.

12. An apparatus for recording in optical form information stored in a computer and in which such information is made up of a plurality of small bits of information and in which each bit is to be recorded in a specific position relative to X axis and Y axis on a recording medium, said computer having a first outlet information tap, a second optic element position outlet tap, which comprises:
- a recording medium having an X dimension and a Y dimension;
- a radiant beam source;
- a radiant beam intensity modulator in the path of the beam from said radiant beam source;
- means connecting said radiant beam modulator to said fisrt outlet information tap of said computer;
- a plurality of optical elements including means responsive to said second optic element position outlet tap of said computer for moving said optical elements into and out of the path of the radiant beam after it has passed through said radiant beam modulator on command from said computer to effect movement of the beam in the X dimension in discrete steps; and means to relatively move said radiant beam in the Y direction in relation to said recording medium while holding the value of X constant.

References Cited

UNITED STATES PATENTS

| | | | |
|---|---|---|---|
| 2,942,538 | 6/1960 | Bechtold | 95—4.5 |
| 3,181,170 | 4/1965 | Akin | 346—108 |
| 3,220,013 | 11/1965 | Harris | 346—107 |
| 3,389,403 | 6/1968 | Cottingham et al. | 346—108 |

JOSEPH W. HARTARY, Primary Examiner

U.S. Cl. X.R.

350—285